UNITED STATES PATENT OFFICE.

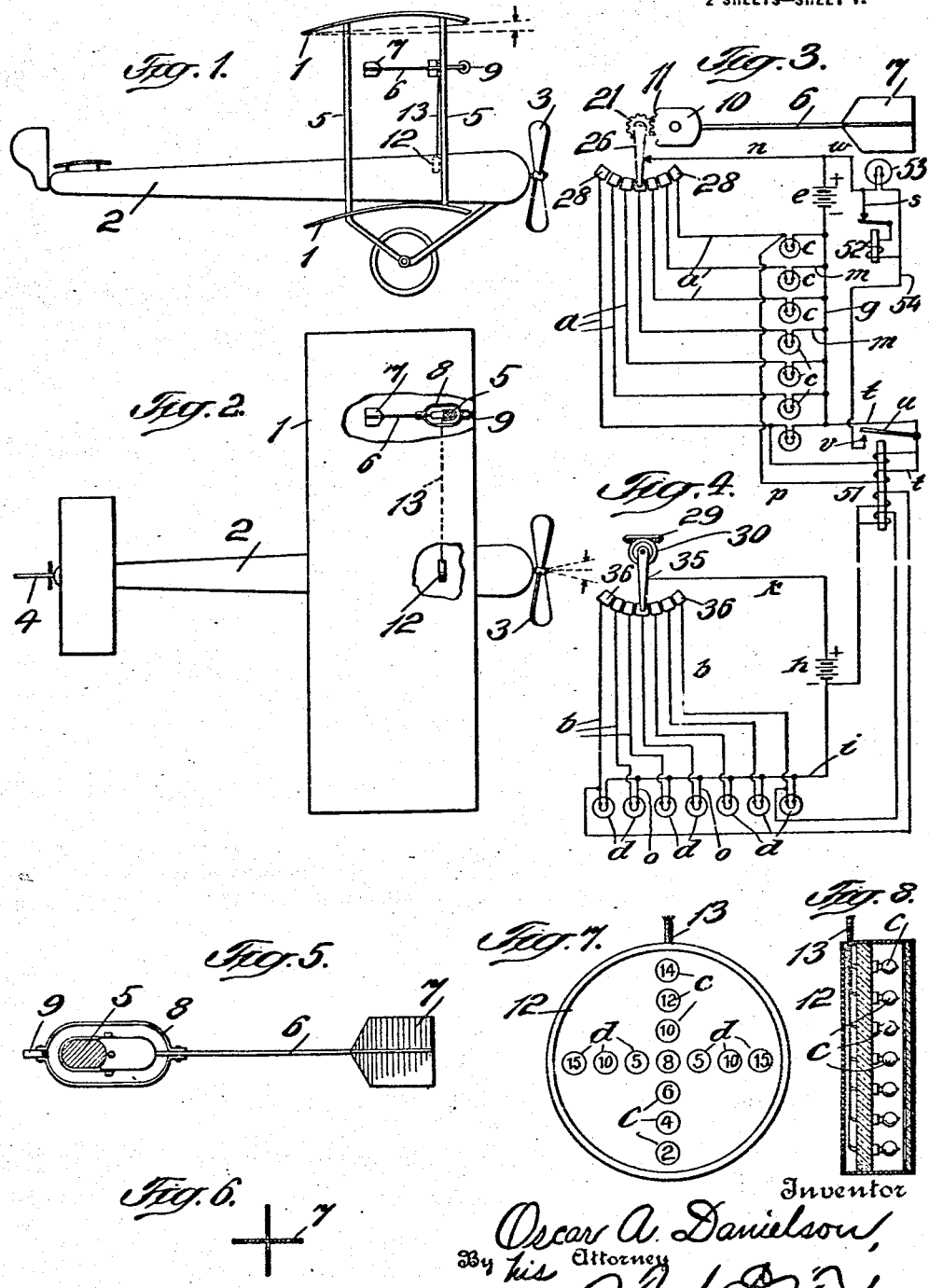
O. A. DANIELSON.
COMBINED INCIDENCE AND SIDE-SLIP INDICATOR FOR AEROPLANES AND THE LIKE.
APPLICATION FILED SEPT. 30, 1916.
1,342,944. Patented June 8, 1920.
2 SHEETS—SHEET 1.

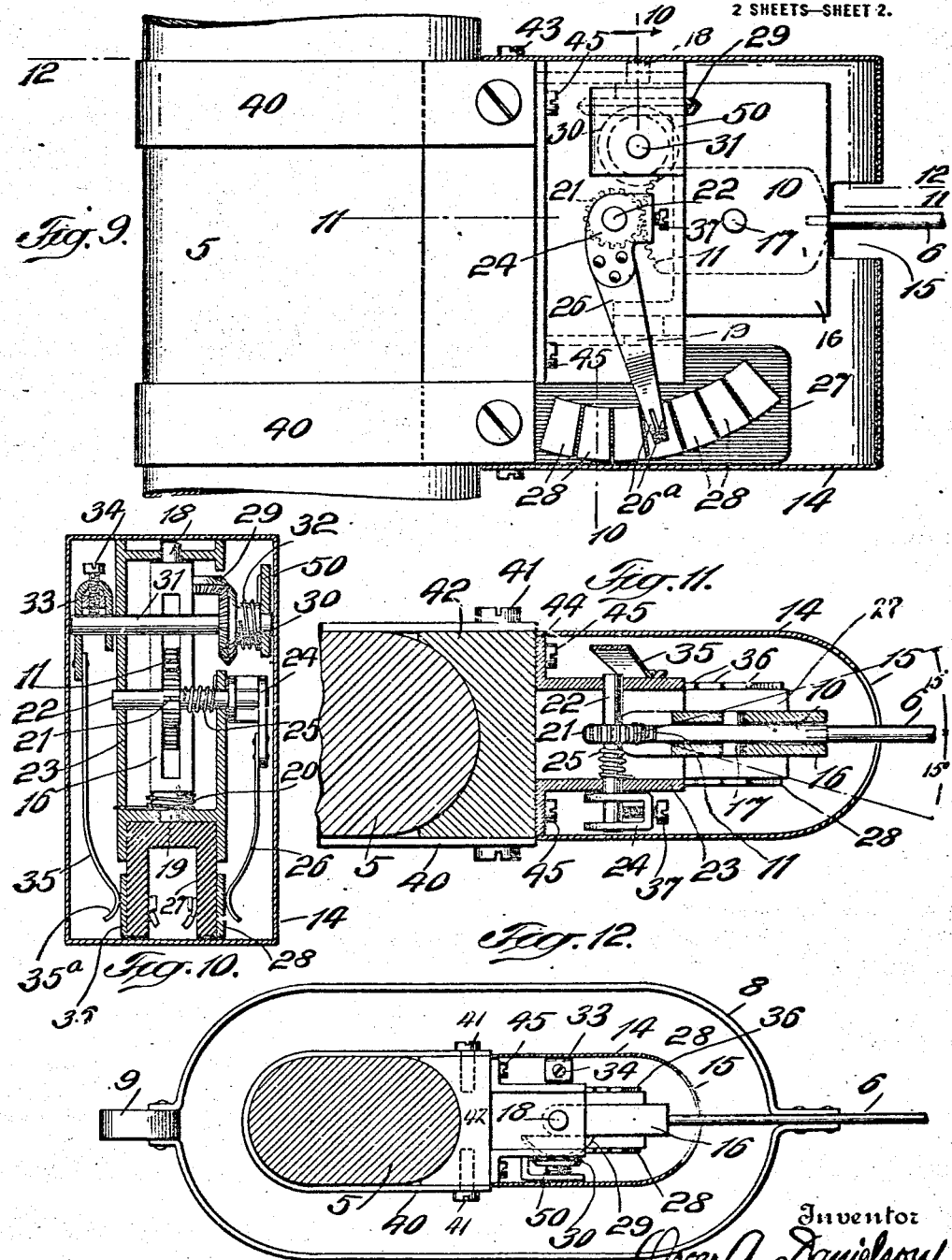

OSCAR A. DANIELSON, OF NEW YORK, N. Y.

COMBINED INCIDENCE AND SIDE-SLIP INDICATOR FOR AEROPLANES AND THE LIKE.

1,342,944.  Specification of Letters Patent.  Patented June 8, 1920.

Application filed September 30, 1916. Serial No. 123,093.

*To all whom it may concern:*

Be it known that I, OSCAR A. DANIELSON, a citizen of the United States, and resident of New York, in the county of New York and State of New York, have invented certain new and useful Improvements in Combined Incidence and Side-Slip Indicator for Aeroplanes and the like, of which the following is a specification, reference being had therein to the accompanying drawing.

This invention refers to aeroplanes, and more particularly to an instrument or device designed to indicate the degrees of two separate and distinct angles relating to the flight or course of an aeroplane or other flying machine through the air.

These two angles are, first, the angle of incidence, or of attack as it is often termed, which is the angle made by the chord of the cambered surfaces of an aeroplane to the stream of air through which it is passing. Such an indicator should be entirely free from the effects of gravitation and should accurately respond to and indicate any change of the direction and flow of air to the supporting surfaces. The angle of attack may be described as that factor in the flight, which, coupled with the speed of the forward movement of the planes, gives to them their lifting or sustaining force. It is also the chief element in determining the head resistance or drag of an aeroplane, for if the angle of incidence or attack becomes too great, the head resistance will increase to a point where it nearly or quite balances the forward thrust of the propeller, (or, if the plane be gliding through the air with its motor shut off, the forward component of the force of gravity) thereby causing loss of speed, or stalling, which in turn results in a loss of lift or sustaining power, so that a fall results. The second angle that is indicated by my present improved instrument is that which is known as the angle of side-slip, the indication being as to whether or not the machine is flying square to the wind; that is to say, by the angle of side-slip is meant the amount of skidding when the machine makes a turn, the action being similar to the lateral acceleration of an automobile when slipping to one side at a turn in a race course. To avoid such slipping action, a track for automobile racing is built high on the outside of the curve and slopes downwardly to the inside thereof, whereby dangerous skidding or side-slipping when making a turn at high speed is avoided. Similarly, in the flight of an aeroplane around a curve it is customary to bank or manipulate the controls for the purpose of raising the wing traveling on the outside of the curve and depressing the wing traveling on the inside of the curve, so that when an aeroplane is properly banked on a turn there will be no side-slipping either toward the outside of the curve or toward the inside. Of course, it is possible to bank the apparatus so steeply that the plane will actually slip laterally toward the inside of the curve, a condition which is extremely dangerous and must be avoided. An aeroplane properly banked is said to be flying square to the wind, and a side-slip indicator is sometimes referred to as a banking indicator. It is of the highest importance in the operation of aeroplanes and similar flying apparatus to keep the course of flight of the plane within proper and safe limits for the two angles just defined, for a disregard of the same has caused a great many fatal accidents.

The object of my invention is to provide a suitable instrument or instruments for indicating the above-mentioned angles, which instruments will permit of placing the controlling mechanism in the most advantageous position for receiving and responding to the direction of flow of the air currents through which the plane is traveling, and at the same time permit the location of the indicating mechanism of the instrument in the most convenient position relatively to the station of the aviator or pilot; and especially to permit the arrangement of the indicating mechanism in such a manner that a high degree of visibility not only in the daytime but also at night will be assured, thus enabling the pilot to read the instrument at all times with a minimum of effort and with only the slightest amount of distraction from the attention he is required to give constantly to the controls. The invention, therefore, consists essentially in means for automatically indicating the angle of incidence or attack of an aeroplane and also the angle of side-slip, and of making these indications jointly or severally through the same or different devices or mechanism.

The invention also comprises an indicating mechanism consisting of a series of lamps or other visual signals for showing the angle of incidence, and another series of similar lamps or visual signals for indicating the angle of side-slip. It also includes an auxiliary signal consisting of a lamp or visual device sometimes larger or more conspicuously placed than the other lamps, with or without a buzzer or audible signal, which auxiliary signal of one or both kinds has the function of giving a special warning when a very dangerous angle of incidence or side-slip is being approached and when through some slight inattention on the part of the pilot a dangerous attitude of the aeroplane might be assumed without a full appreciation by him of the fact, so that a more pronounced notification of the peril is desirable than is given by the other indicators at that moment, and hence by suddenly stimulating his attention by the use of the larger auxiliary signal, accident may be avoided; and the invention may be said to comprise also numerous details and peculiarities in the construction, arrangement, and combination of the various parts, substantially as will be hereinafter described and then more particularly pointed out in the claims.

In the accompanying drawing illustrating my invention:

Figure 1 is a side elevation of an aeroplane provided with my improved incidence and skid angle indicators;

Fig. 2 is a top plan view of the same;

Fig. 3 is a diagrammatic view of the electrical circuits belonging to a series of incandescent electric lamps employed to visually indicate the angle of incidence;

Fig. 4 is a diagrammatic view showing the electrical circuits belonging to a series of incandescent lamps forming a visual indicator of the angle of side-slip or skidding;

Fig. 5 is a detailed plan view of the weather vane which controls the indicators;

Fig. 6 is a cross-section of the tail of the same;

Fig. 7 is a plan view of the dial or signal face which carries the two intersecting rows of incandescent lamps or other signals;

Fig. 8 is a transverse sectional view of the same;

Fig. 9 is an enlarged sectional side view of the mechanism whereby the vane operates a brush or brushes for opening and closing a plurality of electric circuits for the purpose of illuminating the visual signals;

Fig. 10 is a vertical cross-section on the line 10, 10 of Fig. 9;

Fig. 11 is a horizontal section on the line 11, 11 of Fig. 9;

Fig. 12 is a horizontal sectional plan on the line 12, 12 of Fig. 9.

Similar characters of reference designate corresponding parts throughout the different figures of the drawing.

In Figs. 1 and 2 I have shown, for explanatory purposes merely, an example of an aeroplane in outline form, the same being a biplane, having the planes 1, 1 carried by the main longitudinal frame 2, at one end of which frame 2 is a propeller 3, and at the other end a rudder 4, while between the planes 1, 1 are the uprights 5, 5, to one of which is attached a weather vane or transmitting device consisting essentially of a light steel horizontal rod 6, at one end of which is a flat plate or sheet of aluminum 7 attached so as to act as a weather vane and preferably made in the form of a plurality of wings as indicated in cross-section in Fig. 6, while near the other end of the rod 6 is a loop 8 which embraces one of the uprights 5 and carries beyond said upright a counterbalancing weight 9 of any suitable size and shape, it being noted that the rod 6 extends into the loop 8 where its end is attached to a plate 10 formed on the edge thereof with a gear wheel or a curved rack or gear segment 11. The indicating device 12, which is shown in detail in Figs. 7 and 8, preferably employs visual indicators like a series of miniature incandescent electric lamps, since electric means are the most flexible for transmission of impulses between the transmitting device and the indicating devices. These lamps are situated on the instrument board in front of the pilot, as shown in Figs. 1 and 2, and a cable 13 runs from the transmitting device to the indicators (see Figs. 1 and 2). It will be obvious that during the flight of the aeroplane through the air the vane 7 will be acted upon by the currents of air and will have a movement up and down in a vertical plane, or a plane more or less inclined to the vertical accordingly as the aeroplane is tilted to one side or the other, and this up and down movement of the vane will determine the angle of incidence or attack of the plane, said angle being illustrated in a conventional way by the dotted lines and arrows in Fig. 1. Moreover it will be understood that as the machine skids or side-slips, the effect of such slip will be to vibrate the vane 7 sidewise or horizontally, at a greater or less angle, and such side-slip as is shown by this lateral movement will be shown on the indicator. The angle of skidding is conventionally indicated by the dotted lines and arrows at the right hand end of Fig. 2. It is necessary, of course, to provide means whereby information regarding the up and down movement of the vane, as well as the sidewise movement of the same, may be accurately conveyed to the pilot, or to the instrument board arranged subject to his constant inspection, and although many different means may be utilized, yet as electrical means are preferable, I have herein illustrated the way in which electricity is employed for the purpose and how the different circuits are arranged so that the lamps may be individually illuminated and caused to give the proper visual effect to show at a glance the degree of each angle.

Before explaining the circuits, however, I will describe how the transmitting device, consisting essentially of the weather vane 7 and its rod 6 and the gear wheel or segment 10 operate devices which will open and close the different circuits, and thus illuminate or darken the signals. Secured to the upright or stanchion-post 5 is a casing 14 having an opening 15 through which passes the rod 6. The mode of securing the casing 14 to post 5 may vary, but I find it convenient to employ a couple of metallic bands 40 that are fastened by screws 41 to a block 42, to which block the casing 14 is secured by screws 43 or otherwise; also within the casing 14 is a light metallic skeleton frame 23 having flanges 44 that are secured by screws 45 to the block 42. Said frame 23 has journaled therein a short horizontal lower shaft 22 and a short upper shaft 31 which are parallel to each other, and which are used to actuate the brushes that operate to close and open the different electric circuits; furthermore. the frame 23 is properly shaped at its lower end to carry securely a block of insulation 27 which supports a commutator device consisting of a row of contact segments or plates 28 on one side thereof, and on the other side a similar row of contact plates 36, the purpose and use of which will be hereinafter more fully and adequately elucidated.

The rod 6 entering the casing 14 through the opening 15 and carrying on its inner end a plate 10 having a gear segment 11 is pivotally hung by means of the pin 17 in a frame 16 which consists of a vertical block slotted to accommodate the plate therein and provided on its upper end with a trunnion 18 that has a bearing in the upper end of the frame 23 and on its lower end with another trunnion 19 which has a bearing in the lower portion of the frame 23 just above the insulation 27, there being also a spring 20 tensioned between a shoulder on the lower portion of the frame 16 and the adjoining bottom portion of the frame 23, so that a certain pressure will be applied to the frame 16 to take up the looseness in the gears and compensate for the tendency to throw the vane out of place as the consequence of the action of spring 32 hereinafter referred to. The gear segment 11 meshes with a pinion 21 on the shaft 22 journaled, as stated, in the frame 23, there being a spring 25 tensioned between the adjoining vertical wall of frame 23 and some point on the shaft 22, said spring having the function of taking up the backlash in the shaft and giving a steady movement. By the term "backlash" is here meant an effect due to the clearance between the cogs of two gear wheels which mesh together. So long as one wheel continues to drive the other in the same direction, no lost motion or backlash results, but whenever the direction of motion of the drive wheel is reversed it must rotate in the reverse direction a certain distance, which is equivalent to the clearance between two cogs before it starts to move the driven wheel in the reverse direction. The result is a certain lagging behind of the driven wheel whenever the direction of motion is reversed which is called lost motion or backlash. The springs 25 and 32 are powerful enough to overcome the friction of the shafts and brushes attached to them, and the result is that the cogs of the wheels on these shafts are always held over against the cogs of the drive wheels in the direction of rotation exerted by the springs, and the clearance between cogs remains always on one side; hence, there is no lost motion or backlash when the direction of motion is reversed. One end of the shaft 22 projects beyond the end of the frame 23 and thereto is attached a bifurcated block 24 by means of a set-screw 37, to which block 24 is riveted or otherwise secured a brush 26 consisting of a short piece of spring metal such as phosphor bronze which bears firmly against the contact plates 28 and is adapted during the rotation of the pinion 21 and the shaft 22, to wipe back and forth over said plates 28. Thus it will be seen that as the vane 7 moves up and down under action of the air currents which influence it and which also control the angle of incidence of the plane, the rod 6 will through the interengagement of the gear segment 11 and the pinion 21 cause the brush 26 to contact with the different members of the series of plates 28, and will thus close and open different electrical circuits and illuminate and darken different lamps in the manner I shall presently describe. Furthermore, it will be noted that the vertical frame 16, which is pivoted at top and bottom, is capable of rotating in a horizontal plane in consequence of this pivoting. It carries bevel gear segment 29 consisting of half a bevel gear or otherwise, and this engages with the teeth of a bevel pinion 30 secured on the shaft 31 which is journaled in the frame 23. The spring 32 engages the shaft 31 and is also tensioned against a suitable abutment 50, it having the function of keeping the shaft 31 in position and preventing backlash of the parts. The opposite end of the shaft 31 carries a bifurcated block 33 which is securely attached thereto by means of a set-screw 34, and said block has riveted or otherwise secured thereto a brush 35 consisting of a short piece of phosphor bronze or other metal which bears yieldingly against the contact plates 36 or the other series of contacts. Therefore, the vane 7 not only has an up and down movement, corresponding to the angle of incidence, but it also moves sidewise according to the sideslip of the aeroplane, and in so doing it causes the frame 16 to rotate the bevel gear 29, which by its engagement with the bevel gear 30 turns the shaft 31 and actuates the brush 35, causing it to pass from one contact plate 36 to another and open and close different electrical circuits for the purpose of illuminating or darkening one or the other of a series of lamps belonging to the signaling mechanism which indicates the size of the angle of side-slip action or lateral acceleration.

Referring to Figs. 3 and 4 in which the electrical circuits are illustrated, it will be observed that the circuits include a series of lamps $c$, as shown also on the dial or indicator face 12 (see Fig. 7). In the particular example of my invention here given I have shown seven of the lamps $c$ which are for the purpose of indicating the angle of incidence, and these lamps are marked with numerals denoting the number of degrees in the angle of incidence at the moment each lamp is lighted, as for example, beginning at the bottom of the row of lamps, the series runs 2, 4, 6, 8, 10, 12, and 14, differing from each other, therefore, by two degrees in each case. Similarly in Fig. 4 there is a group of electrical circuits shown diagrammatically whereby electrical impulses are transmitted from the weather vane to another series of small incandescent lamps $d$ similar to the lamps $c$ and which are illustrated in Fig. 7 on the dial or indicator face 12, said lamps $d$ being placed in a horizontal series which intersects at the center the series of lamps $a$, and said series of lamps $d$ are also marked with figures indicating the number of degrees in the angles of side-slip corresponding to the position of the parts when the different electrical circuits are closed, and said lamps in the present example are arranged to increase by fives to the right and to the left, that is to say, 5, 10, and 15, running in each direction from the middle lamp which I have said denotes 8 degrees, which is at the center of the vertical series, and it being understood that whether the side-slip is to the right or to the left, the degree thereof will be indicated by the particular lamp. As before stated, these lamps $c$ and $d$ are preferably miniature incandescent lamps with opalescent caps or shades having the figures engraved thereon. Again referring to Fig. 3 and the electrical circuits therein, it will be seen that the brush 26 in its movement wipes over the series of insulated contact pieces 28. Each contact piece 28 connects with a lamp $c$ by a wire $a$, and each lamp $c$ connects with an electrical conductor $g$ through a wire $m$. The conductor $g$ leads to one pole of a galvanic or electric battery $e$, as for example the negative pole, the battery being of suitable voltage for the lamps used, and a wire $n$ connects the other pole of battery $e$, as for example, the positive pole, to the brush 26. The electrical circuit, therefore, for each one of the lamps $c$ which constitute the visual signals for indicating the angle of incidence, will be seen to pass from positive pole of battery $e$ through conductor $n$, brush 26, the particular contact piece 28 on which the brush is at the moment resting, wire $a$, one of the lamps $c$, wire $m$, and conductor $g$ to the negative pole of the battery $e$, which completes the electrical circuit. This circuit is obviously broken and the lamp thrown out of circuit whenever brush 26 passes to another contact piece 28, which new contact, however, will close another circuit and illuminate another lamp, all as will be clearly understood. Similarly in discussing the electrical circuits portrayed in the diagrammatic view in Fig. 4, it will be seen that there is a series of contact pieces 36 over which wipes the brush 35. Each contact piece 36 connects with the lamp $d$ by a wire $b$, and each lamp $d$ connects through a wire $c$ with a conductor $i$ which leads to the battery $h$, while from said battery another conductor $k$ runs to the brush 35, so that it will be clearly perceived that the electrical circuit for each lamp will, when the brush 35 is in contact with the particular contact piece 36 belonging to the circuit for said lamp, pass from the battery $h$ through the conductor $k$, brush 35, this particular contact piece 36, and thence through the conductor $b$ to the lamp $d$, then through the wire $o$, and the wire $i$, back to the battery $h$, completing the circuit so that the particular lamp $d$ in circuit at the time will be illuminated, but when this circuit is broken by the movement of the brush 35 to another contact piece 36 and the lamp is thrown out of circuit, it will be darkened and another lamp lighted when its circuit is closed; and the lighting of the proper lamp $d$ will obviously indicate the number of degrees in the angle of side-slip of the aeroplane, in like manner as the lighting of one or another of the lamps $c$ indicates the number of degrees from time to time of the angle of incidence of the aeroplane.

Suppose that the aeroplane is flying through the air with an angle of incidence as indicated in dotted lines in Fig. 1, of, say, 8 degrees. The vane 7 will be held by the current of air set up by the flight of the aeroplane in a position to cause the brush 26 to rest on one of the segments 28 which will close the electric circuit that illuminates the proper lamp c to show to the pilot that the angle of incidence is 8 degrees; then, if the angle of incidence changes from 8 degrees to a lesser angle, say 6 degrees, that fact will be indicated by the illumination of the lamp marked with the numeral 6, or if it changes to a larger angle, as for example, to 12 degrees, the brush 26 will shaft so that the lamp marked 12 will indicate to the pilot that the angle of incidence is now 12 degrees and so on. Also, if the angle of side-slip happens at any time to be 5 degrees, the brush 35 will be in contact with one of the contacts 36, which will close one electric circuit and illuminate one of the lamps marked 5, accordingly as the side-slip is to one side or to the other, and the pilot will be notified immediately by the illuminatiton of the proper lamp.

An important point of my invention which I wish to emphasize here is that the brushes may be divided or cleft at the active ends thereof into two forks or fingers, as for example, the brush 26 may have the forks 26$^a$ and the brush 35 may have the forks 35$^a$, and the points of contact of these two parts 26$^a$ or 35$^a$, as the case may be, with the contact segments 28 and 36 may be separated from each other by one-half the width of a contact segment. The effect of this will be as follows: Assuming that while the lamp marked with the 8 degree mark, indicating an angle of 8 degrees, is lighted, the brush 26 will be on the exact center of the corresponding contact 28, the point of contact of the brush 26 toward the lesser angle representing the 6 degree circuit would then be one-quarter of the width of the contact piece therefrom; hence, a movement of one-quarter of the width of a contact piece in the travel of the brush 26, representing one-half a degree in the angle of incidence, toward the segment 28 in the 6 degree circuit would bring the brush into contact with said contact segment, while the other portion of the brush would still be in contact with the contact segment in the 8 degree circuit. Thus the lamps indicating the 6 degree angle and the 8 degree angle would both be lighted simultaneously and this would indicate an angle between the two or an angle of 7 degrees, and 7 degrees would continue to be indicated so long as the brush remains upon the two contact segments and until it travels a distance of one-half of the width of a contact segment further in the same direction (thus corresponding to an angle of one degree), after which the brush will leave the contact segment in the 8 degree circuit and be in contact alone with the segment in the 6 degree circuit, lighting only the lamp which indicates an angle of 6 degrees. A further movement of the brush through the width of one-half of a contact segment or one degree of angle of incidence will cause it to make contact with contacts 70 in the 4 degree circuit and 6 degree circuit, lighting the lamps indicating 4 degrees and 6 degrees, whereby an angle of 5 degrees is indicated. A similar result is attained by regulating the width of the brushes instead of cutting their ends into two fingers. Splitting or forking the brushes is resorted to for the purpose of insuring contact at two separate points a given distance apart in order to produce the effect desired. Theoretically, a single solid brush of proper width would produce the same effect, but practically it can not be depended upon to fit well enough to always make contact over its entire width. A brush made up of many separate strands of wire or leaves of sheet metal and of the proper width would meet the requirement, but a brush reduced to its simplest form would consist of two strands or leaves spaced the proper distance apart. Intermediate points of contact are of no value in attaining the particular effect desired. Forking or splitting the brush as shown is the simplest way of obtaining the effect.

From the foregoing it will appear that with the indicator here shown having lamps marked 2, 4, 6, 8, and so forth, or one for every two degrees, angles of incidence for 2, 3, 4, 5, 6, 7, degrees, and so on, can be indicated, although intermediate steps or fractions of one degree can not be indicated. A similar explanation holds good with proper modifications in the number of figures and the differences in parts with regard to the signals pertaining to the angles of side-slip. It will be found moreover that by doubling the number of contact pieces in the electric mechanism and the number of lamps or indicators in the indicating devices, angles of one-half a degree might be indicated. It is entirely practical in the device to mount lamps enough to indicate one-half a degree or even a quarter of a degree, because the entire customary range of flying angles of incidence is within zero to 15 degrees, but it might be questionable if a smaller indication of the angle of incidence or attack than a single degree is required in every day flying for the reason that the air is always in a state of motion and a sensitive indicator which would indicate fractions of a degree would change so rapidly through a considerable arc that the pilot might be unable to follow it as closely as might be desired.

In addition to the indicators and indicating mechanism just described I find it desirable at times to employ an auxiliary or alarm signal, the details of which I have shown in Figs. 3 and 4. 51 denotes an electromagnetic contact device commonly called a relay, having one or more windings as may be required. 52 designates a buzzer, bell, horn, or audible signal, and 53 a larger lamp than those used in the lamp rows c and d, which lamp 53 may be placed in a more conspicuous position than the others if desired. The circuits of the relay windings are parallel with certain of the lamps c and d which represent dangerous angles and are operated over a circuit as follows: assuming that the aeroplane takes on a dangerous angle of 14 degrees, the brush 26 will be moved so as to close a circuit through contact piece 28 to illuminate lamp c marked 14, and a circuit will be completed to light said lamp in the manner already described, and in addition thereto a circuit will be made through the winding of the relay as follows (see Fig. 3). The positive pole of the battery e over a wire n to brush 26, to segment 28 belonging to the 14 degree circuit, wire a to lamp c marked 14 degrees, and also over branch wire p to relay winding 51 and over wire t to the armature u and to wire g and the negative pole of battery e. This will cause the relay 51 to attract its armature u and close the contact v, completing a circuit through lamp 53 and buzzer 52 as follows: positive pole of battery e over wire w to lamp 53 and contact s of buzzer 52, lamp 53 and buzzer 52 to wire 54 to contact v of the relay 51, contact v to armature u to wire t to wire g to the negative pole of the battery e, completing the circuit and causing the lamp 53 to light and give a visual warning danger signal and the buzzer 52 also to vibrate and give an audible warning. Similar electrical connections are made with the circuits relating to the angles of skid.

From the foregoing description, therefore, it will be manifest that my angle-indicating device for aeroplanes and other flying machines possesses great advantages in enabling the pilot to skilfully guide his aircraft through all kinds of air currents, whether they be light or boisterous for he understands all the time exactly what his angle of incidence is and his angle of side-slip, and is able to gage the same down to very small fluctuations, as I have explained. In the construction, operation, and application of the invention many changes may be made in the precise form and arrangement of the parts without exceeding the scope thereof, and I reserve the liberty of making all such changes as are required and permissible in the ensuing claims. Of course, it will be evident that some machines may be built simply with indicating means for the angle of incidence and others with indicating means alone for an angle of side-slip, while others will have both mechanisms, but I am not restricted to the use of both mechanisms, but may use either or both; also, it will be understood that the transmitting mechanism whereby the vane communicates its motion to the visual or audible signals may vary within very wide limits. There may be a great many different kinds of transmitters for transferring the motion; therefore, in the practical application of the invention, I am permitted to utilize the most practical form for the shape and relative arangement of the parts which will produce the best result. It will also be understood that the arrangement of the two rows of lamps into the form of a cross, as shown in Figs. 7 and 8, is for compactness. The row of lamps for the side-slip indicator could be mounted separately from the incidence indicator, in which case the middle or zero degree lamp in the side-slip indicator would be used.

Having thus described my invention, what I claim as new and desire to secure by Letters Patent, is:

1. An indicator to show both the angle of incidence and the angle of side-slip of an aerial machine, comprising a transmitting device, a single indicating means having visual devices for showing the angle of incidence disposed in one group and visual devices for showing the angle of side-slip disposed in another group distinct from the first, the two groups being located within the circle of vision of the pilot when viewing the indicating means, whereby at the same instant the two distinct groups may be observed, the indicating devices of one group being disposed in one line and those of the other in another line, and the said two lines being in angular relationship to each other, and electrical connections between the transmitting device and the indicating means.

2. An apparatus such as described in claim 1 having the two lines of indicating devices crossing each other.

3. An indicator to show both the angle of incidence and the angle of side-slip of an aerial machine comprising a vane supported so as to move in vertical planes and in horizontal planes, a dial having a group of indicating means for showing the angle of incidence and another group of indicating means for showing the angle of side-slip the individual elements of each group being arranged in a line and the lines of the two groups intersecting and two sets of electrical connections between the vane and the groups of indicating devices whereby they are operated as the position of the vane is changed.

4. In an indicator to show both the angle of incidence and the angle of side-slip of an aerial machine, a vane to be acted upon by the air supported so as to be free to move about two axes at right angles to each other, a pair of parallel shafts carrying contact brushes, connections between the vane and one of the parallel shafts whereby the motion of the former about one of its axes is caused to turn this shaft, other connections between the vane and the other parallel shaft whereby its movements about its other axis turns the latter shaft, independent contact segments with which the brushes carried by the aforesaid shafts engage, and electric connections including indicating devices leading respectively from the said segments.

5. In an indicator to show both the angle of incidence and the angle of side-slip in an aerial machine, a vane to be acted upon by the air supported so as to be free to move about two axes at right angles to each other, a casing supported by the frame of the machine and covering the supports for the vane, a pair of parallel shafts carrying contact brushes mounted within the casing, an insulating support within the casing carrying two independent sets of contact segments, connections between the vane and one of the parallel shafts whereby the motion of the former about one of its axes is caused to turn this shaft, other connections between the vane and the other parallel shaft whereby its motions about its other axisns the latter shaft and electric connections including indicating devices leading respectively from the contact segments.

6. In an indicator adapted for use in showing angles assumed by an aerial machine, a vane to be acted upon by the air, a shaft, gear connections between the vane and shaft by which the latter is turned as the vane is moved by the air, indicating devices controlled by the movements of the shaft, and a spring tension device connected with the shaft for maintaining the gear connection between it and the vane in constant close engagement and preventing backlash between these gear connected parts.

7. In an angle-indicator for aeroplanes and the like, the combination of a vane, a series of signals for indicating the angle of incidence, electrical means for transmitting the movements of the vane to said signals, a series of signals for indicating the angle of side-slip, electrical means for transmitting the movements of the vane to said signals, and an emergency angle of incidence signal and also an emergency angle of side-slip signal for indicating dangerous angles, together with electrical means for operating them simultaneously with the operation of certain of the other signals.

In testimony whereof I hereunto affix my signature.

OSCAR A. DANIELSON.